US010430972B2

United States Patent
Dahlström et al.

(10) Patent No.: US 10,430,972 B2
(45) Date of Patent: Oct. 1, 2019

(54) METHOD OF CALIBRATING A DIRECTION OF A PAN, TILT, ZOOM, CAMERA WITH RESPECT TO A FIXED CAMERA, AND A SYSTEM IN WHICH SUCH A CALIBRATION IS CARRIED OUT

(71) Applicant: Axis AB, Lund (SE)

(72) Inventors: Robin Dahlström, Lund (SE); Mattias Gylin, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/110,535

(22) Filed: Aug. 23, 2018

(65) Prior Publication Data
US 2019/0066335 A1    Feb. 28, 2019

(30) Foreign Application Priority Data

Aug. 29, 2017  (EP) .................................... 17188260

(51) Int. Cl.
*G06T 7/80*    (2017.01)
*G06K 9/62*    (2006.01)
(Continued)

(52) U.S. Cl.
CPC .............. *G06T 7/80* (2017.01); *G06K 9/6215* (2013.01); *G06T 7/74* (2017.01); *G08B 13/196* (2013.01);
(Continued)

(58) Field of Classification Search
None
See application file for complete search history.

(56) References Cited

U.S. PATENT DOCUMENTS

| 2007/0196016 A1* | 8/2007 | Chen ......................... G06T 7/80 |
| | | 382/190 |
| 2010/0033567 A1* | 2/2010 | Gupta .................. H04N 17/002 |
| | | 348/143 |
| 2018/0336704 A1* | 11/2018 | Javan Roshtkhari .. G03B 43/00 |

FOREIGN PATENT DOCUMENTS

| CN | 103105858 A | 5/2013 |
| CN | 104537659 A | 4/2015 |

(Continued)

OTHER PUBLICATIONS

"Large-Area, Multilayered, and High-Resolution Visual Monitoring Using a Dual-Camera System"; ACM Trans. Multimedia Comput. Commun. Appl., vol. 11, No. 2, Article 30, Publication Date: Dec. 2014; 30:1-30:23.

"A novel image similarly measure for image registration"; Kalinić et al.; Sep. 4, 2011; XP055451380; Retrieved from the Internet: URL:http://ieeexplore.ieee.org/ielx5/6036253/6046561/o6046605.pdf [retrieved on Feb. 15, 2018].

(Continued)

Primary Examiner — James M Hannett
(74) Attorney, Agent, or Firm — Volpe and Koenig, P.C.

(57) ABSTRACT

A method of calibrating a pan, tilt, zoom (PTZ) camera with a fixed camera utilizing an overview image of a scene captured by the fixed camera, and an image of the scene captured by the PTZ camera when directed in a first direction. By matching features in the overview image and the PTZ camera image, a first calibration is carried out by correlating the first direction to matching features in the overview image. A mapping between the PTZ camera image and the overview image is defined based on the matching features. The mapping is used to map an object from the PTZ camera image to the overview image. Based on an appearance of the mapped object, a quality of the mapping is calculated. If the quality is not good enough, the PTZ camera is redirected to a second direction, and a further calibration is carried out by again.

14 Claims, 4 Drawing Sheets

(51) Int. Cl.
*G06T 7/73* (2017.01)
*H04N 5/232* (2006.01)
*H04N 5/247* (2006.01)
*G08B 13/196* (2006.01)
*H04N 17/00* (2006.01)
*G06T 7/60* (2017.01)
*G06T 7/13* (2017.01)

(52) U.S. Cl.
CPC ..... *H04N 5/23229* (2013.01); *H04N 5/23296* (2013.01); *H04N 5/23299* (2018.08); *H04N 5/247* (2013.01); *H04N 17/002* (2013.01); *G06T 7/13* (2017.01); *G06T 7/60* (2013.01); *G06T 2207/20164* (2013.01); *G06T 2207/30232* (2013.01)

(56) References Cited

FOREIGN PATENT DOCUMENTS

| | | |
|---|---|---|
| CN | 104574425 A | 4/2015 |
| EP | 2 722 831 A2 | 4/2014 |
| EP | 2 722 831 A3 | 2/2016 |
| SG | 191 452 A1 | 7/2013 |

OTHER PUBLICATIONS

"SIFT Feature Point Matching Based on Improved RANSAC Algorithm"; Shi Guangjun et al.; 2013 5th International Conference on Intelligent Human-Machine Systems and Cybernetics; IEEE, vol. 1, Aug. 26, 2013; pp. 474-477; XP032515674.
EP 17 18 8260.8 European Search Report (dated Feb. 21, 2018).

\* cited by examiner

METHOD OF CALIBRATING A DIRECTION OF A PAN, TILT, ZOOM, CAMERA WITH RESPECT TO A FIXED CAMERA, AND A SYSTEM IN WHICH SUCH A CALIBRATION IS CARRIED OUT

FIELD OF INVENTION

The present invention relates to the field of cameras. In particular, it relates to a method and system for calibrating a direction of a pan, tilt, zoom camera with respect to a fixed camera.

BACKGROUND

There exist camera systems, such as the Axis Q6000-E series, which integrate one or more fixed sensors with a movable, pan, tilt, zoom (PTZ) camera. The fixed sensors may typically be arranged to provide an overview of a scene, such as a complete 360° field of view, whereas the PTZ camera may be arranged to be directed to and zoom in on specific portions of the scene. In such a system, a user may, for instance, indicate a specific portion of the scene towards which the PTZ camera should be directed by clicking in an overview image provided by one of the fixed sensors. Following such a click, the PTZ camera will be directed to and/or zoom in on the specific portion of the scene.

The viewing direction (i.e., the pan and tilt settings) and/or the zoom of the PTZ camera may thus be controlled by clicking in the images captured by the fixed sensors. Such control of the PTZ camera may rely on a relation between positions in the images captured by the one or more fixed sensors on the one hand, and directions of the PTZ camera on the other hand. Typically, the required relation may be determined from the geometry and optics of the camera system, including the relative positions of the fixed sensors and the PTZ camera, once the direction of the PTZ camera has been initially calibrated with respect to the fixed sensors. More specifically, as the PTZ camera is installed in the camera system, its viewing direction in relation to those of the fixed sensors is not known, and it therefore needs to be calibrated. Such calibration typically aims at finding a correlation between a position in an image captured by one of the fixed sensors and a direction of the PTZ camera.

The patent application published as SG 191452 A1 describes a feature-matching approach for calibrating a PTZ camera with respect to a wide field of view camera. In particular, a method for determining a correlation between a coordinate of an image captured by the wide field of view camera and PTZ-values of the PTZ camera is provided. The precision of the method of SG 191452 A1 relies on the accuracy of the matching of features in the wide field of view image and in an overlapping image captured by the PTZ camera image. The accuracy of the feature matching may in turn depend on several factors, such as the number of features being present in the images and properties of the lenses of the cameras. In the former example, it may happen that the PTZ camera is directed towards a portion of the scene where few objects are present, thereby resulting in few relevant features in the images. In the latter example, it may happen that, due to barrel distortion or other geometric distortions in the wide field of view image, it is difficult to accurately match the features. In both of these examples, the precision of the calibration may in the end be suffering. There is therefore need for improvements.

SUMMARY

In view of the above an improved precision when calibrating a PTZ camera in relation to a fixed camera is presented.

According to a first aspect, a method of calibrating a direction of a pan, tilt, zoom, PTZ, camera is performed with respect to a first, fixed, camera, comprising:

receiving an overview image of a scene captured by a first, fixed, camera, directing a PTZ camera in a first direction, when the PTZ camera is in the first direction, performing the steps of:

a) receiving an image of the scene captured by the PTZ camera, wherein a field of view of the image captured by the PTZ camera partly overlaps a field of view the overview image, b) identifying a first set of features in the image of the scene captured by the PTZ camera, c) localizing the first set of features, or a subset thereof, in the overview image so as to associate the first set of features in the image captured by the PTZ camera with a second set of features in the overview image, d) logging positional data of the second set of features in the overview image, e) defining a mapping between the image captured by the PTZ camera and the overview image based on the first set of features and the second set of features, mapping an object in the image captured by the PTZ camera to the overview image by using the defined mapping, and calculating a quality of the mapping based on an appearance of the object after mapping to the overview image, performing a first calibration of the PTZ camera by correlating the first direction of the PTZ camera with the positional data of the second set of features being logged when the PTZ camera is directed in the first direction, in case the quality of the mapping is below a first threshold:

redirecting the PTZ camera to a second direction, performing steps a)-d) when the PTZ camera is in the second direction, and performing a second calibration of the PTZ camera by correlating the second direction of the PTZ camera with positional data of the second set of features being logged when the PTZ camera is directed in the second direction.

According to the above method, a first calibration based on feature mapping is carried out when the PTZ camera is directed in a first direction. If it is found that the quality of the mapping is not good enough, i.e., that the quality is below a threshold, the PTZ camera is redirected to a second direction, and a second calibration based on feature mapping is carried out when the PTZ camera is in the second direction. By re-directing the PTZ camera and repeating the calibration when the quality is not good enough, the quality and precision of the resulting calibration may be improved.

By calibration of a direction of a PTZ camera with respect to a fixed camera is generally meant to find a correspondence between a direction of the PTZ camera and a position in an image captured by the fixed camera.

By a mapping between the image captured by the PTZ camera and the overview image is generally meant a function or transformation which maps points in the image captured by the PTZ camera to points in the overview image. The mapping may, e.g., be defined by a transformation matrix.

By quality of a mapping is generally meant a metric which is evaluated based on an appearance, such as size and shape, of an object after the mapping has been applied. The quality of a mapping is typically a measure of how well the mapping preserves the appearance of an object.

The method may further comprise performing step e) when the PTZ camera is in the second direction, wherein the step of performing a second calibration of the PTZ camera is made on a condition that the quality of the mapping calculated in step e) when the PTZ camera is in the second direction is greater than or equal to the first threshold. In this way, the second calibration is only made if the quality of the mapping when the PTZ is in the second direction is good enough.

The method may further comprise keep redirecting the PTZ camera to further directions, and repeating steps a)-e) until the quality of the mapping calculated in step e) is greater than or equal to the first threshold. The PTZ camera may thus be redirected until a mapping of good enough quality is achieved. In this way, the precision of the calibration may be further improved.

As further discussed above, the accuracy of a feature matching, and in turn the quality of a mapping defined by the matching set of features, may depend on the number of features present in the images. For example, if the PTZ camera, when directed in the first direction, is directed towards a region in the scene where few objects are present, there will likely be few features in the image of the scene captured by the PTZ camera to base the mapping upon. As a result, the accuracy of the matching, and thereby the quality of the mapping, will typically be worse than if more features had been present in the PTZ camera image. In order to improve the quality of the mapping, the PTZ camera may therefore be re-directed to a portion of the scene where more objects are present, thereby resulting in more features in the image captured by the PTZ camera. Such a portion of the scene may be located by considering the overview image and identifying an area therein comprising many features. When such an area in the overview image has been identified, the PTZ camera may be redirected, using the first calibration as an initial calibration, such that the PTZ camera captures an image covers or at least overlaps the identified area. In more detail, the method may comprise: identifying an area in the overview image where a density of features in the overview image exceeds a second threshold, and selecting the second direction on basis of the first calibration of the PTZ camera such that an image captured by the PTZ camera when directed in the second direction covers the identified area in the overview image. The density of features may, e.g., be calculated as the number of features per unit area in the overview image.

Another factor that may affect the accuracy of the feature matching, and in turn the quality of a mapping defined by the matching set of features, is the properties of the lenses of the cameras. For example, the overview image may, in contrast to the image captured by the PTZ camera, be captured by a wide-angle-lens which gives rise to barrel-distortion or other distortions, such as pincushion distortion or moustache distortion, of the overview image. These distortions affect perspectives and proportions in the resulting overview image. Such distortions will typically be more pronounced at the periphery of the overview image, and less pronounced in the center of the overview image. Therefore, one may expect that the accuracy of the matching of features in the overview image and the image captured by the PTZ camera may be higher if the PTZ camera is directed such that it points to a portion of the scene which is depicted at the center of the overview image. The method may therefore comprise: selecting the second direction on basis of the first calibration of the PTZ camera such that an image captured by the PTZ camera when directed in the second direction covers a center of the overview image. The PTZ camera may thus be redirected, using the first calibration as an initial calibration, such that the image captured by the PTZ camera covers or at least overlaps the center of the overview image.

As mentioned above, the first set of features identified in the image captured by the PTZ camera and the second set of features identified in the overview image is used to define a mapping, e.g., in the form of a transformation matrix. By that mapping, points in the image captured by the PTZ camera may be mapped to points in the overview image. The mapping may also be used to map an object in the image captured by the PTZ camera to the overview image. For example, each point of the object, or selected points of the object may be mapped using the defined mapping. The appearance of the object when mapped to the overview image may then be used to calculate a quality of the mapping. In particular, calculating the quality of the mapping may include calculating a similarity between an appearance of the object in the image captured by the PTZ camera and an appearance of the object after mapping to the overview image. If the object has a similar appearance after the mapping, the quality of the mapping is considered to be high, while if the mapping changes the appearance a lot, the quality of the mapping is considered to be low. The quality of a mapping is hence a measure of how well the mapping preserves the appearance of an object.

The method may further compensate for barrel-distortion in the overview image when calculating the similarity of the appearance of an object before and after mapping to the overview image. For example, assume that the object in the image captured by the PTZ camera has a rectangular shape. Even if a perfect match of features, and a perfect mapping is found, the rectangular shape would still not be rectangular in the overview image, since the barrel distortion alters perspectives and proportions of the rectangular shape. It would therefore make more sense to compare the appearance of the rectangle after mapping to the overview image to the shape that a rectangle would have when altered by the barrel distortion, rather than by comparing it to the original rectangular shape. Therefore, the method may, prior to calculating the similarity, adjust the appearance of the object in the image captured by the PTZ camera on basis of properties of a lens system of the first camera. In this way, dissimilarities in appearance of the object caused by barrel-distortion of the overview image will not influence the similarity calculation, and thereby not influence the determined quality of the mapping. The amount of barrel-distortion may be deduced from the properties of the lens system of the first camera.

Alternatively, barrel-distortion of the overview image may be taken into account by tolerating a lower quality of the mapping closer to the boundaries of the overview image. This may be realized by allowing the first threshold, to which the quality of the mapping is compared, to decrease with a distance from the center of the overview image. More specifically, the first threshold may depend on the positional data of the second set of features, such that the first threshold decreases with a distance from a center of the overview image.

The appearance of the object may be at least one of a size of the object and a geometrical shape of the object.

The object in the image captured by the PTZ camera may correspond to a periphery, i.e., the boundary, of the image captured by the PTZ camera. Thus, the object does not need to correspond to an object in the scene. The periphery of the image captured by the PTZ camera may be mapped to the overview image by mapping the four corner positions, i.e., the four corner coordinates of the image captured by the PTZ camera, to the overview image using the mapping. The object in the image captured by the PTZ camera may thus have a rectangular shape.

A feature, such as the features of the first set of features and the second set of features, may include at least one of an edge or a corner in a captured image of the scene. A feature may further be associated with attributes, such as color, size and/or direction. The attributes of a feature identified in the image captured by the PTZ camera may be used when localizing a corresponding feature in the overview image. In this way, the feature matching may be simplified and made more accurate.

The first fixed camera and the PTZ camera may be part of a system which includes further fixed cameras. In case the relation between the first fixed cameras, such as their relative positions and viewing directions, is not known, the above method should be repeated for each fixed camera. If the relation between the fixed cameras is known, the calibration carried out with respect to the first fixed camera may be used in the calibration of the further fixed cameras in the system. In such case, the method may further comprise: capturing a further overview image of the scene using a second, fixed, camera having a known position and direction in relation to the first camera, and calibrating the PTZ camera with respect to the further overview image of the scene captured by the second camera on basis of the first or second calibration of the first camera and the known position and direction of the second camera in relation to the first camera.

According to a second aspect, the above is achieved by a system, comprising:

a first, fixed, camera arranged to capture an overview image of a scene, a pan, tilt, zoom, PTZ, camera which is separate from the first, fixed camera, and a controller operatively connected to the first camera and the PTZ camera, the controller being configured to direct PTZ camera in a first direction, and, when the PTZ camera is in the first direction, to perform the steps of:

a) controlling the PTZ camera to capture an image of the scene, wherein a field of view of the image captured by the PTZ camera partly overlaps a field of view of the overview image, b) identifying a first set of features in the image of the scene captured by the PTZ camera, c) localizing the first set of features, or a subset thereof, in the overview image of the scene so as to associate the first set of features in the image captured by the PTZ camera with a second set of features in the overview image, d) logging positional data of the second set of features in the overview image, e) defining a mapping between the image captured by the PTZ camera and the overview image based on the first set of features and the second set of features, mapping an object in the image captured by the PTZ camera to the overview image by using the defined mapping, and calculating a quality of the mapping based on an appearance of the object after mapping to the overview image, the controller further being configured to:

perform a first calibration of the PTZ camera by correlating the first direction of the PTZ camera with the positional data of the second set of features being logged when the PTZ camera is directed in the first direction, in case the quality of the mapping is below a first threshold:

redirect the PTZ camera to a second direction, perform steps a)-d) when the PTZ camera is in the second direction, and perform a second calibration of the PTZ camera by correlating the second direction of the PTZ camera with positional data of the second set of features being logged when the PTZ camera is directed in the second direction.

The system may further comprise:

at least one further fixed camera, wherein the first camera and the at least one further fixed camera are directed in different directions so as to capture overview images covering different portions of the scene, wherein the PTZ camera is mounted in relation to the first camera and the at least one further fixed camera such that the PTZ camera is directable to capture images which overlap an overview image captured by the first camera, and to capture images which overlap an overview image captured by the at least one further fixed camera.

According to a third aspect, there is provided a computer program product comprising a (non-transitory) computer-readable medium having computer code instructions stored thereon for carrying out the method according to the first aspect when executed by a processor.

The second and third aspects may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages will be better understood through the following illustrative and non-limiting detailed description of embodiments with reference to the appended drawings, where the same reference numerals will be used for similar elements, wherein.

DETAILED DESCRIPTION OF THE PREFERRED EMBODIMENTS

The description will be set forth more fully hereinafter with reference to the accompanying drawings, in which embodiments of the invention are shown. However, the teachings may be embodied in many different forms and should not be construed as limited to the embodiments set forth herein; rather, these embodiments are provided for thoroughness and completeness, and to fully convey the scope of the invention to the skilled person. The systems and devices disclosed herein will be described during operation.

Figure 1:
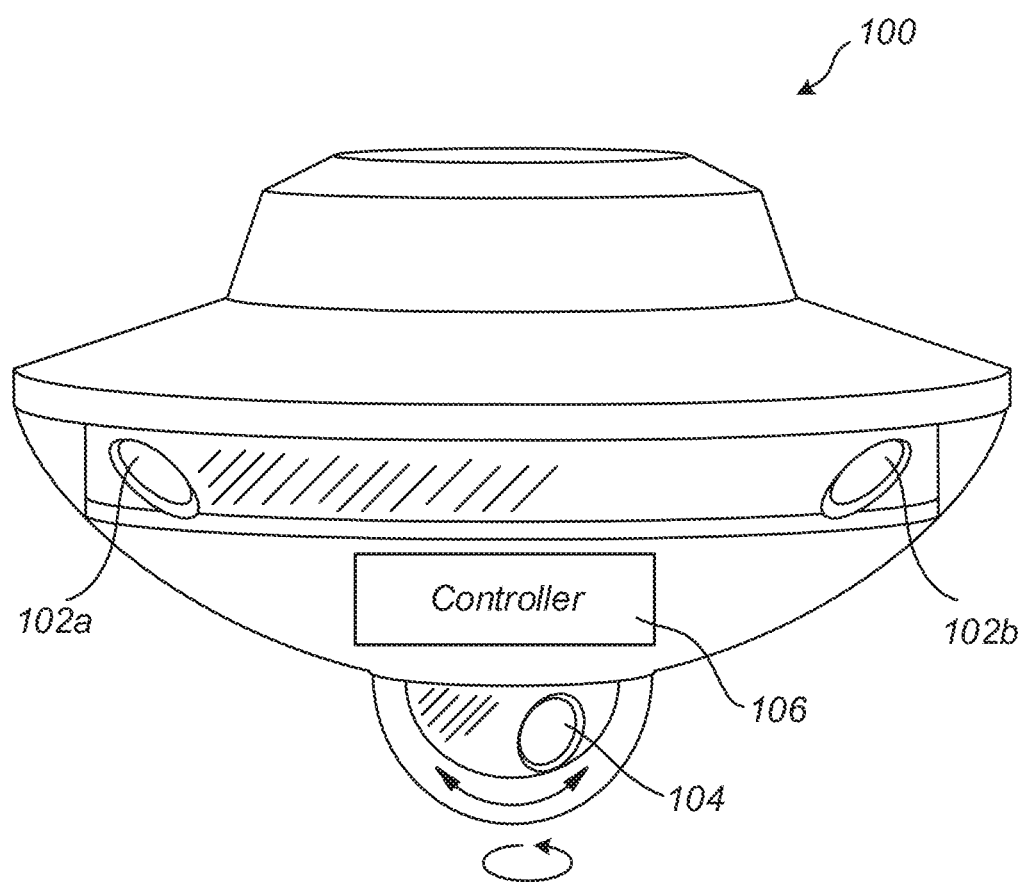
FIG. 1 schematically illustrates a camera system according to embodiments.

FIG. 1 illustrates a camera system 100. The camera system 100 may, for example be used to monitor a scene. The camera system 100 comprises one or more fixed cameras 102a, 102b, a movable camera 104, and a controller 106. The illustrated camera system 100 comprises four fixed cameras of which two fixed cameras 102a, 102b are visible in FIG. 1.

The fixed cameras 102a, 102b are fixed in the sense that they are capturing a fixed view of the scene, i.e., the same view all the time. Each of the fixed cameras 102a, 102b is thus directed in a fixed direction all the time, and is not arranged to be redirected in different directions during use. The fixed cameras may be arranged on a rail or guide such that their field of view may be altered manually by moving the camera along the rail or guide, and by adjusting a tilt angle. The one or more fixed cameras 102a, 102b are typically directed in different directions so as to capture images covering different portions of the scene. The one or more fixed cameras 102a, 102b thus have different fields of view, although the fields of view of the cameras 102a, 102b may overlap. For example, the one or more cameras 102a, 120b may be arranged such that their combined field of view covers a complete 360° field of view of the scene.

Figure 2:
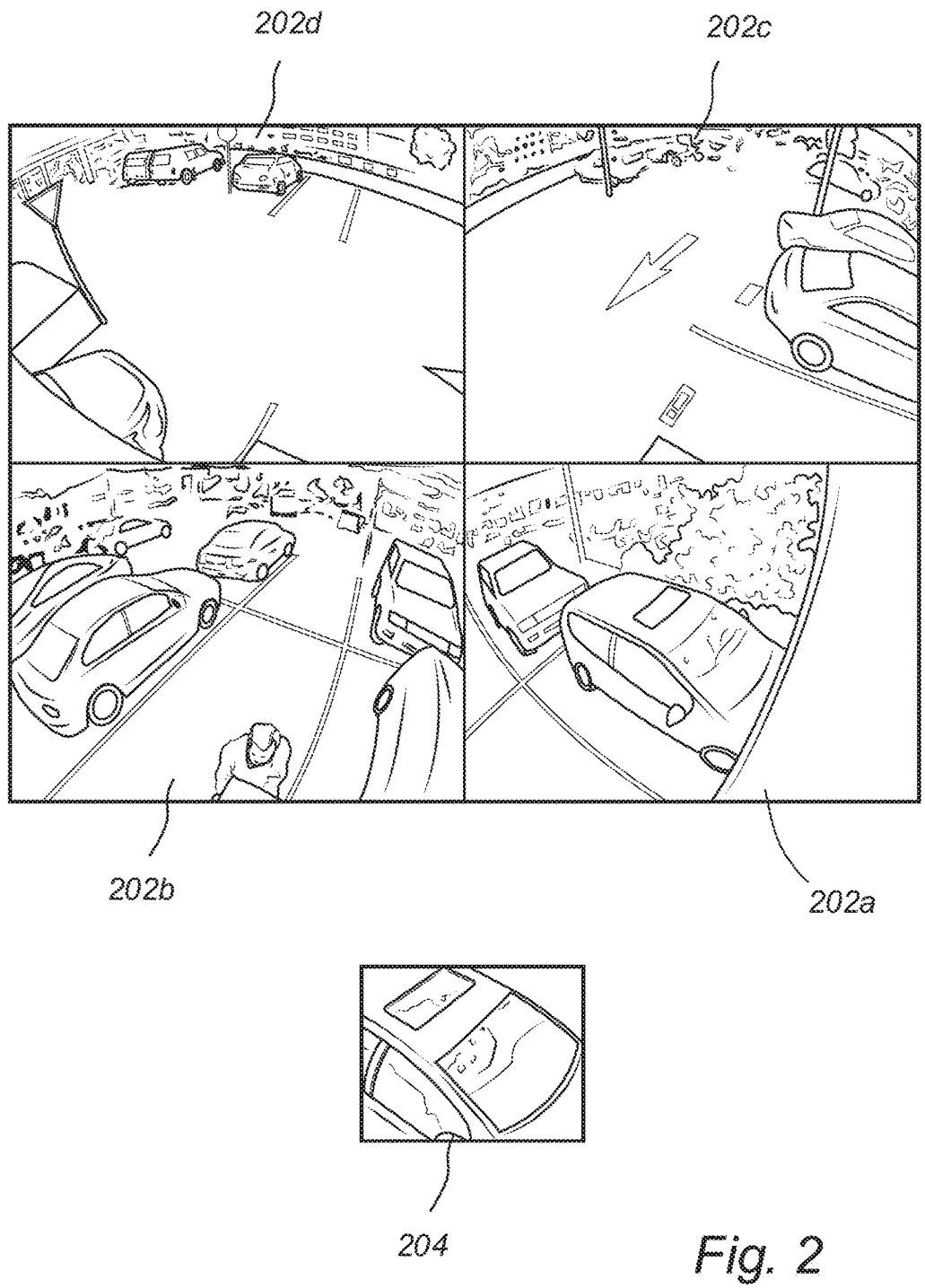
FIG. 2 illustrates overview images of a scene captured by fixed cameras and an image captured by a movable, PTZ, camera.

The one or more fixed cameras 102a, 102b are each arranged to capture an overview image of the scene. For this purpose, the one or more fixed cameras 102a, 102b may each be equipped with a wide-angle lens allowing the one or more fixed cameras 102a, 102b to capture a wide angular range of the scene. FIG. 2 illustrates four overview images 202a, 202b, 202c, 202d which are captured by the four fixed cameras of the camera system 100. The images 202a, 202b, 202c, 202d depicts a scene, in this case a parking lot, from different angles. For example, the overview image 202a may be captured by the fixed camera 102a, and the overview image 202b may be captured by the fixed camera 102b. As can be seen from the images, the fields of view of the one or more cameras 102a, 102b overlap. The car which is depicted in the middle of overview image 202a is, for instance, also depicted at the bottom right corner of overview image 202b.

The one or more fixed cameras 102a, 102b are mounted such that their positions in relation to each other are known. Further, the directions of the one or more fixed cameras 102a, 102b in relation to each other are typically also known. This does, e.g., allow the angle (i.e., the difference in direction) between two points in the scene to be determined from the coordinates of the two points as depicted in overview images captured by two different ones of the fixed cameras 102a, 102b.

The movable camera 104 may be a PTZ camera. The movable camera 104 may hence be redirected by adjusting the pan and tilt settings, as illustrated by the arrows in FIG. 1, such that its field of view is altered to cover different parts of the scene. In particular, the PTZ is mounted in relation to the one or more fixed cameras 102a, 102b such that the PTZ is directable to capture images of different portions of the complete field of view covered by the one or more fixed cameras 102a, 102b. The movable camera 104 may hence be directed to capture images which overlap with each of the overview images captured by the one or more fixed cameras 102a, 102b. FIG. 2 illustrates an image 204 captured by the movable camera 104. The image 204 overlaps with the overview image 202a and depicts the windscreen of the car that is also depicted in the middle of overview image 202a.

The movable camera 104 has typically a narrower field-of-view compared to the fixed cameras 102a, 102b. However, the movable camera 104 is advantageous in that it can be directed towards and zoom in on different portions, such as interesting objects, in the scene. Further, as can be seen in FIG. 2, due to the wide-angle optics of the fixed cameras 102a, 102b, the overview images 202a, 202b, 202c, 202d are subject to barrel-distortion causing perspectives and proportions in the images to be distorted. The image 204 captured by the movable camera 204 does not suffer from such distortions.

The controller 106 may generally be arranged to control the movable camera 104 so as to control the movable camera 104 to look in different directions. The controller 106 may be implemented in software. For this purpose, it may comprise a processor, such as a microprocessor, a digital signal processor, of a field programmable gate array, and a non-transitory memory, such as a non-volatile memory. The non-transitory processor may store computer code instructions which, when executed by the processor, causes the controller to carry out any method described herein. In particular, it may be cause to carry out a method of calibrating a direction of the movable camera 104 with respect to the fixed cameras.

The control of the movable camera 104 may be based on user input, such as input concerning specific positions in the overview images 202a, 202b, 202c, 202d. For example, the controller 106 may be arranged to receive input from an operator regarding a specific position, i.e., pixel coordinate, in one of the overview images 202a, 202b, 202c, 202d and, in response thereto, change the direction of the movable camera 104 from its current direction such that the field of view cover a portion of the scene depicted in that position in the overview image 202a, 202b, 202c, 202d. For that purpose, the controller 106 may make use of a relation which associates different pixel coordinates in the overview images 202a, 202b, 202c, 202d with different directions, i.e., pan/tilt settings, of the movable camera 104. Such a relation depends on the geometry of the camera system 100 and the optics, such as lenses, of the cameras 102a, 102b, 104. However, once the geometry and the optics has been set, the relation may be determined and stored, e.g., in the form of a function or table, in a non-volatile memory of the controller 106. Such a relation is typically pre-determined and pre-stored in the controller 106.

The controller 106 typically works with relative changes in directions, i.e., based on the pre-stored relation it redirects the movable camera 104 from a first direction corresponding to a first position in an overview image, to a second direction corresponding to a second position in an overview image. Accordingly, upon installation of the camera system 100, and before the controller 106 can start to use such a relation for controlling the movable camera 104, the movable camera 104 and more specifically its direction needs to be calibrated with respect to the one or more fixed cameras 102a, 102b. This means that the controller 106 needs to find a correspondence between the initial direction of the PTZ camera and a position in an overview image captured by one of the fixed cameras. A method for performing such a calibration will now be described with reference to FIGS. 1, 2, 4 and the flowchart of FIG. 3.

Figure 4:
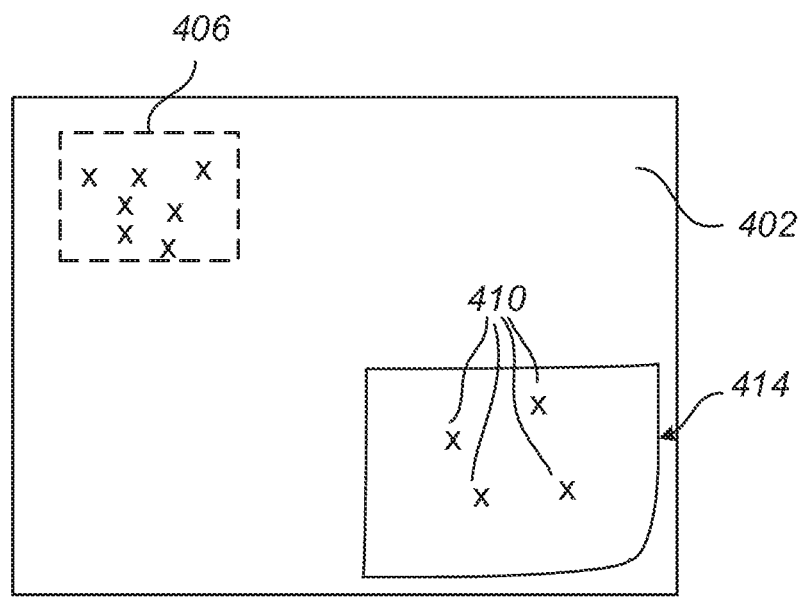
FIG. 4 schematically illustrates an overview image captured by a fixed camera and an image captured by a movable, PTZ, camera.
Figure 4:
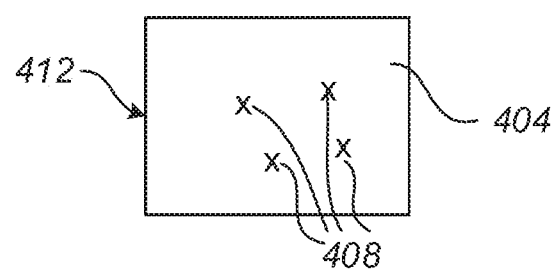

In step S02, the controller 106 receives an overview image. The overview image is captured by one of the fixed cameras 102a, 102b. FIG. 4 illustrates an overview image 402 which, for instance may correspond to overview image 202a of FIG. 2. In some embodiments, the controller 106 receives overview images from more than one or from all of the fixed cameras 102a, 102b as shown in FIG. 2.

In step S04, the controller 106 directs the movable camera 104 to look in a first direction. The first direction is arbitrary and may correspond to the direction that the movable camera 104 has upon installation.

With the movable camera 104 directed in the first direction, the controller 106, in step S06a receives a first image 404 from the movable camera 104. The first image 404 may, for instance, correspond to the image 204 of FIG. 2. A field of view 406 of the first image 404 partly overlaps a field of view of the overview image 402. In case of there being several overview images captured by different fixed cameras, the first image 404 will overlap with at least one of the overview images.

Next, the controller 106, in step S06b, identifies a first set of features 408 in the first image 404. The features may, for instance, be edges or corners in the first image 404. The features may further have associated attributes, such as size, color and/or direction. The features may be extracted from the first image 404 by using conventional techniques, such as applying filters to the first image 404. An example of an algorithm that can be used to extract the features is the scale-invariant feature transform (SIFT). The features are illustrated by "x" in FIG. 4. The controller 106 may also log, i.e., store, the positions, such as pixel coordinates, of the identified features 408. The first set of features 408 may also be associated with a single positional data, such as the mean value of the positions of the individual features in the set.

In step S06c, the controller 106 performs feature matching. In more detail, the controller 106 localizes the first set of features, or a subset thereof, in the overview image 402. In this way, the controller 106 may associate the first set of features in the image 404 with a second set of features 410 in the overview image 402. Step S06c may be carried out by first extracting features from the overview image 402 and then matching the first set of features 408 to the extracted features to find a best match. The best match is then the second set of features 410. This may be carried out by using any known feature matching algorithm which is suitable for this purpose. For example, algorithms from the fast library for approximate nearest neighbors (FLANN) may be used to find the best matches. In case of several overview images, the feature matching may be carried out with respect to each of the overview images, so as to find the best match among possible matches in all overview images.

In step S06d, the controller 106 logs i.e., stores, the positions, such as pixel coordinates, of the features 410. The second set of features 410 may also be associated with a single positional data, such as the mean value of the positions of the individual features in the set.

In step S06e, the controller 106 uses the first set of features 408 and the second set of features 410 to define a mapping between the image 404 captured by the movable camera 104 and the overview image 402 captured by the fixed camera 102a, 102b. The mapping may for example be defined in terms of a transformation matrix which maps points in the image 404 to points in the overview image 402. The transformation matrix may, e.g., be determined based on the first set of features 408 and the second set of features 410 by applying a least-squares method. More specifically, the transformation matrix may be determined as the matrix that maps the positions of the features 408 of the first set as close as possible, in a least-square sense, to the positions of the features in the second set 410.

The controller 106 then uses the defined mapping to map an object in the image 404 to the overview image 402. The object may for instance correspond to an object depicted in the overview image 402, such as the wind screen of the car in shown in image 204 of FIG. 2. In this example, the object does however correspond to the rectangular periphery 412 of the image 404. The object may be mapped to the overview image 402 by applying the transformation matrix to all points that belong to the object. Alternatively, the object may be represented by a selected number of points which are mapped to the overview image by application of the transformation matrix. The mapped object 414, i.e. the rectangular periphery 412 when mapped to the overview image is illustrated as a deformed rectangle in FIG. 4

Due to different factors, the appearance of the mapped object 414 may look different than the original object 412. According to a first factor, the first set of features 408 may not properly match the second set of features 410, which results in that the defined mapping does not map positions in the image 404 correctly to corresponding position in the overview image 402. According to a second factor, the barrel distortion of the overview image 402 will cause any object in the overview image 402 to have a different appearance than in the image 404. The second factor will be more pronounced closer to the boundary of the overview image 402.

The controller 106 may calculate a quality of the mapping based on the appearance of the mapped object 414. The quality of the mapping is typically a measure of how well the mapping preserves the appearance of an object, and it may be determined to take the first factor or both the first and second factor described above into account. Generally, the quality of the mapping may be any metric which is evaluated based on the appearance of the mapped object. This may include evaluating the size and/or geometrical shape of the mapped object 414.

In some embodiments, the quality of the mapping is calculated by comparing the appearance of the object 412 before mapping and the object 414 after mapping. In particular, the quality of the mapping may be calculated based on the similarity between the appearance of the object 412 before mapping and the object 414 after mapping. This may concern measuring the similarity in shape and/or similarity in size. The so calculated quality of the mapping will take both the first factor and the second factor referred to above into account. In order to measure the similarity in shape of the object 412, the object may be represented by a plurality of points, such as points on its periphery. For a rectangular object, the corner points would preferably be chosen. One may then compare the relation between these points before and after mapping of the object. For example, one may look at how much the distances between the points have been changed by the mapping. The amount of change, in relation to the original distance between the points may be used as a measure of the similarity in shape. In order to measure similarity in size, the area of the object after and before mapping may be compared.

For a rectangular object, a high similarity in shape is received if the four corners of the object still define a rectangle after the mapping. On the contrary, a low similarity is received if the four corners are mapped to lie on a line. Further, a high similarity in size is achieved if the size of the rectangle, after mapping, i.e., the area covered by the object after mapping, has a size which corresponds to the expected one taking the different lenses of the cameras into account. In contrast, a low similarity in size is achieved if the size of the rectangle after mapping has a much larger or much lower size than expected.

In other embodiments, it is desirable that the quality of the mapping only reflects the first factor mentioned above. In such cases, the effect of the second factor, i.e., distortions due to barrel distortions, should be removed prior to calculating the quality of the mapping. The effect of the barrel distortion may be removed based on known properties of the lens systems, i.e., the wide-angle lenses, of the fixed camera 102a, 102b. More specifically, having such lens system properties at hand, the controller 109 may calculate what the object 412 in the image 404 would look like in the overview image 402, i.e., how the wide-angle lens would depict such an object at the position of the second feature set in the overview image. The controller 106 may then proceed to adjust the appearance of the object 412 to which the mapped object 414 is to be compared, such that the adjusted appearance is the same as the calculated appearance that the object 412 would have when depicted by the wide-angle lens. Having adjusted the appearance of the object 412, the controller 106 may proceed to measure the similarity of the mapped object 414 and the adjusted appearance of the object 412 in accordance with what was described above.

In step S10, the controller 106 performs a first calibration of the movable camera 104. In more detail, the controller 106 correlates the first, current, direction of the camera with the positional data of the second set of features which was logged in step S06d described above. In this way, the controller thus finds a first correspondence between a direction of the movable camera 104 and a position in the overview image 402.

In step S12, the controller 106 checks whether the determined quality of the mapping is below a first threshold T1. The first threshold may be a constant, predefined, value. In some embodiments, typically when the quality of the mapping has been calculated without removing the effect of the barrel distortion, the first threshold may be a decreasing function of the distance of the position of the second set of feature to a center of the overview image. In other words, the quality of the mapping may be allowed to be lower closer to the boundary of the overview image 402 where the effect of the barrel distortion is more pronounced. This may be used as an alternative to correcting for the effect of the barrel distortion when calculating the quality of the mapping.

If the quality of the mapping is not below the first threshold T1 the method ends, and the first calibration becomes the final calibration. If, however, the quality of the mapping is below the first threshold T1, the controller 106 proceeds to step S14 where it controls the movable camera 104 to change direction from the first direction to a second direction.

As further described above, the quality of the mapping is highly dependent on finding a good match between features in the image 404 and the overview image 402. A poor match, resulting in a mapping of poor quality, may be due to the movable camera 104 being directed towards a portion of the scene where there are few objects to depict since this results in there being few features to extract from the image 402. This could, e.g., happen if the movable camera 104 is directed towards the asphalt of the parking lot depicted in FIG. 2, such as towards the center of the overview image 202d. According to embodiments, the movable camera 104 may therefore be redirected towards a portion of the scene where there are more objects and interesting features. That portion of the scene may be depicted in the same overview image 402, or in an overview image captured by another one of the fixed cameras 102a, 102b. In order to achieve this, the controller 106 may proceed to identify an area 406 in the overview image 402 (or in one of the other overview image captured by another fixed camera) where there are many features, e.g., where the number of features per unit area exceeds a second threshold. By using the pre-defined relation described above which associates directions of the movable camera 104 and positions in the overview image 402, and using the correspondence established by the first calibration as an initial calibration of the direction, the controller 106 may calculate how to redirect the movable camera 104 from the first direction to a second direction in which an image captured by the movable camera 104 covers the identified area 406 of the overview image 402.

According to other embodiments, the influence of the barrel-distortion or other geometric distortions, such as pincushion distortion and moustache distortion, on the quality of the mapping may instead be reduced by redirecting the movable camera 104 from the first direction to a second direction in which an image captured by the movable camera 104 covers a center of the overview image 402, where the barrel-distortion is less pronounced. Again this may be achieved by using the pre-defined relation which associates directions of the movable camera 104 and positions in the overview image 402, and using the correspondence established by the first calibration as an initial calibration of the direction.

According to yet other embodiments, the controller 106 may select the second direction at random.

Once the movable camera 104 has been redirected, it proceeds to step S16. In step S16, the controller 106 repeats at least steps S06a-S06d described above, but now with the movable camera 104 directed in the second direction.

In some embodiments, the controller 106 proceeds to step S20 described below of performing a further calibration once steps S06a-d have been repeated for the second direction.

In other embodiments, the controller 106 also repeats step S06e with the camera in the second direction. In such embodiments, the controller 106 typically also performs step S18 of comparing the quality of the mapping calculated with the camera in the second direction to the first threshold. If the quality is good enough, i.e., greater than or equal to the first threshold, the controller 106 proceeds to step S20 of performing a further calibration. If the quality of the mapping is not good enough, i.e., below the first threshold, the controller 106 once again goes back to repeat steps S14 of redirecting the movable camera 104, S16 of repeating steps S06a-e, and S18 of checking whether the quality of the mapping is below the first threshold. The controller 106 may keep repeating steps S14, S16, and S18 until the quality of the mapping is greater than or equal to the first threshold, whereby the controller 106 proceeds to step S20 of performing a further calibration.

In step S20 the controller 106 performs a further calibration, i.e., a second calibration. In more detail, the controller 106 correlates the current direction of the camera with the positional data of the second set of features which was logged the last time step S06d was repeated under step S16 as described above. In this way, the controller thus finds a further correspondence between a direction of the movable camera 104 and a position in the overview image 402. Once the controller 106 has performed the further calibration, the method ends, whereby the final calibration is equal to the further calibration of step S20.

It is to be noted that when there are several fixed cameras 102a, 102b having a known position and direction in relation to a first one of the fixed cameras, such as in the camera system 100, the movable camera 104 may conveniently be calibrated with respect to the other fixed cameras once it has been calibrated with the first fixed camera. In more detail, once a correlation between a direction of the movable camera 104 and a position in an overview image captured by a first of the fixed cameras has been established, a correlation between a direction of the movable camera 104 and a position in an overview image of each of the other of the fixed cameras may be calculated. The calculation may be based on the calibration of the first fixed camera and the known position and direction of the other cameras in relation to the first fixed camera.

Figure 3:
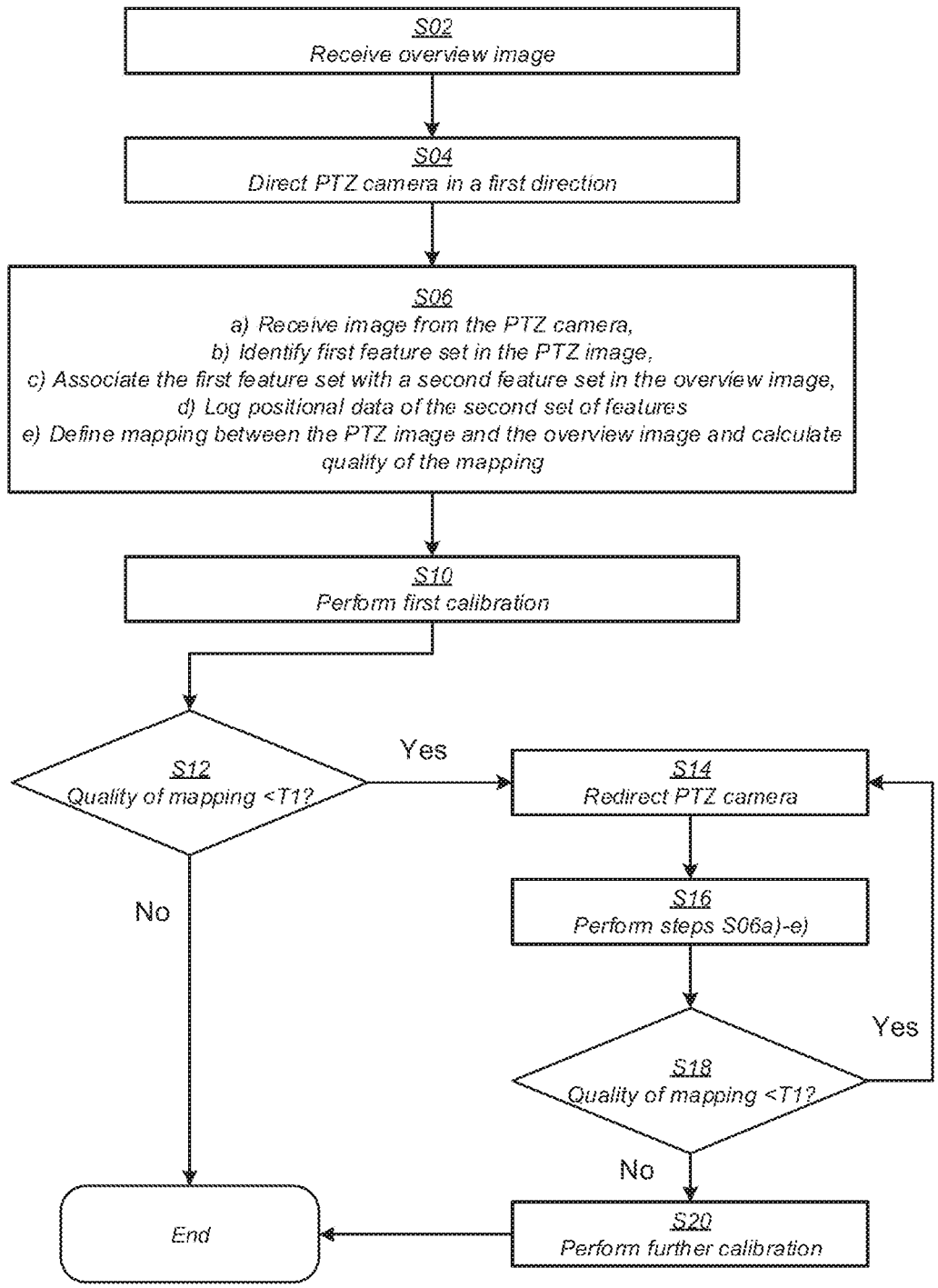
FIG. 3 is a flowchart of a method according to embodiments.

If there are several fixed cameras 102a, 102b for which the relative positions and directions are not known, the movable camera 104 needs to be calibrated with respect to each of the cameras by applying the method illustrated in FIG. 3 and described above. In this situation, the problem may arise that it may be difficult to find a direction and zoom level of the PTZ camera which causes it to overlap with a field of view of a certain one of the fixed cameras. This may for example be the case if the certain fixed camera has a high zoom level. This problem may be simplified once the PTZ camera has been calibrated with respect to one or more of the fixed cameras since the fields of view of the already calibrated fixed cameras may be excluded from the search range of the PTZ camera when searching for the field of view of the certain fixed camera. Also, if several ones of the fixed cameras already have been calibrated, such as a first, second, and fourth of the fixed cameras of the camera system of FIG. 1, the PTZ camera may search for the field of view of the third camera in between the fields of view of the second and the fourth camera.

It will be appreciated that a person skilled in the art can modify the above-described embodiments in many ways and still use the advantages of the invention as shown in the embodiments above. Thus, the teachings should not be limited to the shown embodiments but should only be defined by the appended claims Additionally, as the skilled person understands, the shown embodiments may be combined.

What is claimed is:

1. A method of calibrating a direction of a pan, tilt, zoom, PTZ, camera with respect to a first, fixed, camera, comprising:
    receiving an overview image of a scene captured by a first, fixed, camera,
    directing a PTZ camera in a first direction,
    when the PTZ camera is in the first direction, performing the steps of:
    a) receiving an image of the scene captured by the PTZ camera, wherein a field of view of the image captured by the PTZ camera partly overlaps a field of view the overview image,
    b) identifying a first set of features in the image of the scene captured by the PTZ camera,
    c) localizing at least a portion of the first set of features in the overview image so as to associate the at least a portion of first set of features in the image captured by the PTZ camera with a second set of features in the overview image,
    d) logging positional data of the second set of features in the overview image,
    e) defining a mapping between the image captured by the PTZ camera and the overview image based on the at least a portion of first set of features and the second set of features, and calculating a quality of the mapping,
    performing a first calibration of the PTZ camera by correlating the first direction of the PTZ camera with the positional data of the second set of features being logged when the PTZ camera is directed in the first direction,
    in case the quality of the mapping is below a first threshold:
    redirecting the PTZ camera to a second direction,
    performing steps a)-d) when the PTZ camera is in the second direction, and
    performing a second calibration of the PTZ camera by correlating the second direction of the PTZ camera with positional data of the second set of features being logged when the PTZ camera is directed in the second direction,
    wherein step e) further comprises mapping an object in the image captured by the PTZ camera to the overview image by using the defined mapping, wherein calculating the quality of the mapping includes calculating a similarity between an appearance of the object in the image captured by the PTZ camera and an appearance of the object after mapping to the overview image.

2. The method of claim 1, further comprising performing step e) when the PTZ camera is in the second direction, wherein the step of performing a second calibration of the PTZ camera is made on a condition that the quality of the mapping calculated in step e) when the PTZ camera is in the second direction is greater than or equal to the first threshold.

3. The method of claim 1, further comprising:
    keep redirecting the PTZ camera to further directions, and repeating steps a)-e) until the quality of the mapping calculated in step e) is greater than or equal to the first threshold.

4. The method of claim 1, further comprising:
    identifying an area in the overview image where a density of features in the overview image exceeds a second threshold, and
    selecting the second direction on basis of the first calibration of the PTZ camera such that an image captured by the PTZ camera when directed in the second direction covers the identified area in the overview image.

5. The method of claim 1, further comprising:
    selecting the second direction on basis of the first calibration of the PTZ camera such that an image captured by the PTZ camera when directed in the second direction covers a center of the overview image.

6. The method of claim 1, wherein, prior to calculating the similarity, the appearance of the object in the image captured by the PTZ camera is adjusted on basis of properties of a lens system of the first camera.

7. The method of claim 1, wherein the first threshold depends on the positional data of the second set of features, such that the first threshold decreases with a distance from a center of the overview image.

8. The method of claim 1, wherein the appearance of an object is at least one of a size of the object and a geometrical shape of the object.

9. The method of claim 1, wherein the object in the image captured by the PTZ camera corresponds to a periphery of the image captured by the PTZ camera.

10. The method of claim 1, wherein a feature includes at least one of an edge or a corner in a captured image of the scene.

11. The method of claim 1, further comprising
    capturing a further overview image of the scene using a second, fixed, camera having a known position and direction in relation to the first camera, and
    calibrating the PTZ camera with respect to the further overview image of the scene captured by the second camera on basis of the first or second calibration of the first camera and the known position and direction of the second camera in relation to the first camera.

12. A system, comprising:
    a first, fixed, camera arranged to capture an overview image of a scene, a pan, tilt, zoom, PTZ, camera which is separate from the first, fixed camera, and a controller operatively connected to the first camera and the PTZ camera, the controller being configured to direct PTZ camera in a first direction, and, when the PTZ camera is in the first direction, to perform the steps of:

a) controlling the PTZ camera to capture an image of the scene, wherein a field of view of the image captured by the PTZ camera partly overlaps a field of view the overview image, b) identifying a first set of features in the image of the scene captured by the PTZ camera, c) localizing at least a subset of the first set of features in the overview image of the scene so as to associate the at least a subset of the first set of features in the image captured by the PTZ camera with a second set of features in the overview image, d) logging positional data of the second set of features in the overview image, e) defining a mapping between the image captured by the PTZ camera and the overview image based on the at least a subset of the first set of features and the second set of features, and calculating a quality of the mapping, the controller further being configured to:

perform a first calibration of the PTZ camera by correlating the first direction of the PTZ camera with the positional data of the second set of features being logged when the PTZ camera is directed in the first direction, in case the quality of the mapping is below a first threshold:

redirect the PTZ camera to a second direction, perform steps a)-d) when the PTZ camera is in the second direction, and perform a second calibration of the PTZ camera by correlating the second direction of the PTZ camera with positional data of the second set of features being logged when the PTZ camera is directed in the second direction, wherein step e) further comprises mapping an object in the image captured by the PTZ camera to the overview image by using the defined mapping, wherein calculating the quality of the mapping includes calculating a similarity between an appearance of the object in the image captured by the PTZ camera and an appearance of the object after mapping to the overview image.

13. The system of claim 12, further comprising:

at least one further fixed camera, wherein the first camera and the at least one further fixed camera are directed in different directions so as to capture overview images covering different portions of the scene, wherein the PTZ camera is mounted in relation to the first camera and the at least one further fixed camera such that the PTZ camera is directable to capture images which overlap an overview image captured by the first camera, and to capture images which overlap an overview image captured by the at least one further fixed camera.

14. A non-transitory computer-readable medium having computer code instructions stored thereon for carrying out the method according to claim 1.

* * * * *